(12) United States Patent
Tan et al.

(10) Patent No.: US 8,354,166 B2
(45) Date of Patent: Jan. 15, 2013

(54) COATED POLYMER DIELECTRIC FILM

(75) Inventors: Daniel Qi Tan, Rexford, NY (US);
George Theodore Dalakos, Niskayuna, NY (US); Yang Cao, Niskayuna, NY (US); Qin Chen, Schenectady, NY (US); Ri-an Zhao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 37 days.

(21) Appl. No.: 13/036,089

(22) Filed: Feb. 28, 2011

(65) Prior Publication Data

US 2012/0219791 A1    Aug. 30, 2012

(51) Int. Cl.
*B32B 9/04* (2006.01)

(52) U.S. Cl. ........ 428/332; 428/336; 428/337; 428/412; 428/451

(58) Field of Classification Search .................. 428/332, 428/336, 337, 412, 451
See application file for complete search history.

(56) References Cited

U.S. PATENT DOCUMENTS

| | | | |
|---|---|---|---|
| 5,294,295 A | 3/1994 | Gabriel | |
| 5,490,035 A | 2/1996 | Yen et al. | |
| 5,636,100 A | 6/1997 | Zheng et al. | |
| 5,643,834 A | 7/1997 | Harada et al. | |
| 6,426,861 B1 | 7/2002 | Munshi | |
| 6,444,537 B1 | 9/2002 | Robinson | |
| 6,974,547 B1 | 12/2005 | Kohara et al. | |
| 7,428,137 B2 | 9/2008 | Dowgiallo, Jr. | |
| 7,488,507 B2 | 2/2009 | Kubacki | |
| 7,542,265 B2 | 6/2009 | Tan et al. | |
| 7,786,839 B2 | 8/2010 | Soendker et al. | |
| 2006/0093758 A1* | 5/2006 | Sakakura et al. | 428/1.6 |
| 2008/0123250 A1 | 5/2008 | Tan et al. | |
| 2008/0225378 A1 | 9/2008 | Weikert et al. | |
| 2009/0263647 A1 | 10/2009 | Gangopadhyay et al. | |

FOREIGN PATENT DOCUMENTS

| | | |
|---|---|---|
| DE | 4101788 A1 | 7/1992 |
| EP | 1786006 A1 | 5/2007 |
| JP | 1984205723 A | 11/1984 |
| JP | 1995161572 A | 6/1995 |
| JP | 2008198681 A | 8/2008 |

OTHER PUBLICATIONS

Nakano et al., "Effect of Plasma Polymer Coating on The Dielectric Strength of Polyethylene", Proceedings of the 3rd International Conference on Conduction and Breakdown in Solid Dielectrics, Trondheim, Norway, Jul. 3-6, 1989, pp. 374-376.

Lu et al., "Characterization of Methyl-Doped Silicon Oxide Film Deposited Using Flowfill™ Chemical Vapor Deposition Technology", Journal of Vacuum Science and Technology B: Microelectronics and Nanometer Structures, May 2002, vol. 20, Issue 3, pp. 828-833.

(Continued)

*Primary Examiner* — D. S. Nakarani

(74) *Attorney, Agent, or Firm* — Mary Louise Stanford

(57) ABSTRACT

Present invention provides a film and an article including the film. The film includes first layer, second layer and third layer. The first layer includes a polymer dielectric material. The second layer is disposed on at least one surface of the first layer and includes inorganic oxide dielectric material. The third layer is disposed on the first or second layer and includes a nitride or oxynitride material.

15 Claims, 5 Drawing Sheets

OTHER PUBLICATIONS

Slenes et al., "Pulse Power Capability of High Energy Density Capacitors Based on a New Dielectric Material", Electromagnetic Launch Technology (EML) Symposium, 2001, San Francisco, CA, vol. 37, Issue 1, pp. 324-327.

Winsor et al., "New Polymer Dielectric for High Energy Density Film Capacitors" Downloaded from the Internet: <http://ecadigitallibrary.com/pdf/CARTSUSA08/5_3a%20Winsor-Aerovox.pdf> on Feb. 25, 2011, 14 Pages.

Cao et al., "Electronic Devices Containing Polyetherimide Components", Pending U.S. Appl. No. 12/895,416, filed Sep. 30, 2010, 40 Pages.

Sheldon Jay Shafer., "Polyethermide Resins Useful for High Temperature Applications, and Related Processes", Pending U.S. Appl. No. 12/924,666, filed Sep. 30, 2010, 33 Pages.

Search Report and Written Opinion from corresponding EP Application No. 11192362.9-2102 dated Jun. 19, 2012.

* cited by examiner

COATED POLYMER DIELECTRIC FILM

STATEMENT REGARDING FEDERALLY SPONSORED RESEARCH AND DEVELOPMENT

This invention was made with Government support under contract number FA9451-08-C-0166, awarded by the Defense Advanced Research Projects Agency (DARPA), U.S. Department of Defense. The Government has certain rights in the invention.

BACKGROUND

The invention relates generally to coated polymer dielectric films and specifically to polymer dielectric films coated with inorganic materials.

Polymers with high resistivity, high permittivity, low dissipation factors and high electric field breakdown strengths (Vb) have important applications as dielectrics in electronic devices, such as a capacitor. The electronic industry is cost- and performance-driven, and constantly increasing demands are made on materials to lower cost, and improve their reliability and performance. Polymer based devices have long been of interest because manufacturing technologies associated with extrusion or solution casting of polymer films can be readily combined with thin film metallization techniques, to yield devices that are flexible and economical, and which can be manufactured into very large electronic devices.

Polymer based electronic devices have been used for many power electronics and pulse power applications, because of their inherent low dielectric losses, excellent high frequency response, low dissipation factor (DF), low equivalent series resistance (ESR), and high voltage capabilities. However, most of the dielectric polymers are characterized by low energy densities (<5 J/cc), and/or have low breakdown strength (<450 kV/mm), which may limit the operating voltage of an electronic device. Other disadvantages are relating to thermal stability and reduced lifetime, for example. In order to achieve high energy density, it may be desirable to have both high dielectric constant and high breakdown strength. A trade-off between these two properties may not be advantageous. Most dielectric polymers that exhibit high breakdown strength have a relatively low dielectric constant.

There is a need for polymer materials that would address the aforementioned problems and meet the current demands of electronics industry applications. Therefore, it is important to devise a method and formulate a structure including polymer materials that results in a considerably high dielectric constant and relatively high breakdown strength. Further, there is a need for structures and materials that are stable at humid environments, for the ease of handling while forming polymer based electronic devices.

BRIEF DESCRIPTION

One aspect of the present invention provides a film. The film includes a first layer, second layer and third layer. The first layer includes a polymer dielectric material. The second layer is disposed on at least one surface of the first layer and includes inorganic oxide dielectric material. The third layer is disposed on the first or second layer and includes a nitride or oxynitride material.

One aspect of the present invention provides a film. The film includes a first layer, second layer and third layer. The first layer has first and second surfaces and includes a polyetherimide composition having structural units derived from a cyanobisphenol monomer. The second layer is disposed on first surface of the first layer and includes silicon dioxide. The third layer is disposed on second surface of the first layer and includes silicon nitride.

One aspect of the present invention provides an electronic article. The electronic article includes a film. The film includes a first layer, second layer and third layer. The first layer includes a polyetherimide composition having structural units derived from a cyanobisphenol monomer. The second layer is disposed on at least one surface of the first layer and includes silicon dioxide. The third layer is disposed on the first or second layer and includes silicon nitride.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
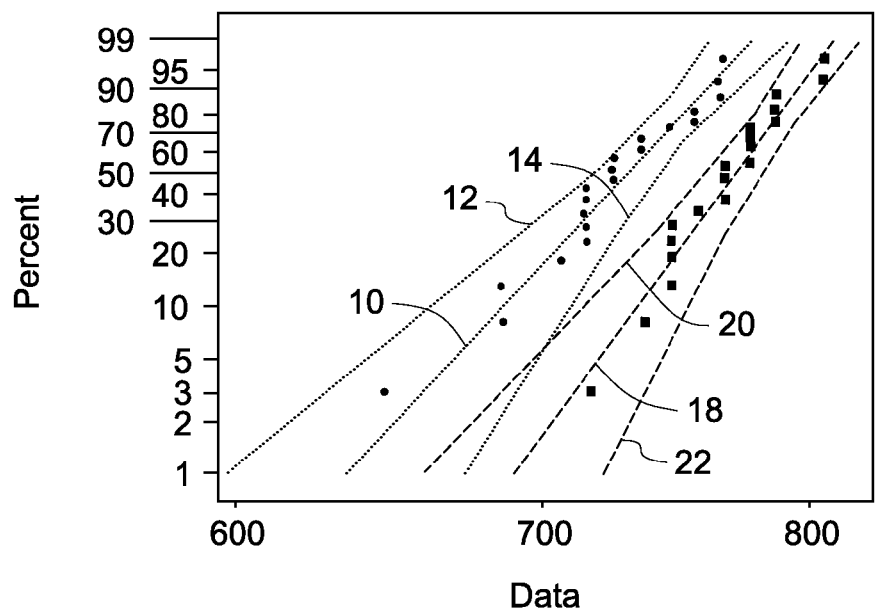
FIG. 1 is a comparative weibull probability plot, in accordance with one aspect of the invention.

In the specification and claims, reference will be made to a number of terms, which have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

Some of the dielectric properties considered herein are dielectric constant, and breakdown strength. The "dielectric constant" of a dielectric material is a ratio of the capacitance of a capacitor, in which the space between and around the electrodes is filled with the dielectric, to the capacitance of the same configuration of electrodes in a vacuum. As used herein, the term "dissipation factor" or "dielectric loss" refers to the ratio of the power dissipated in a dielectric material, to the power applied. The dissipation factor is usually measured as the tangent of the loss angle (δ), or the cotangent of the phase angle. As used herein, "breakdown strength" refers to a measure of the dielectric breakdown resistance of a dielectric material under an applied AC or DC voltage. The applied voltage prior to breakdown is divided by the thickness of the dielectric material to provide the breakdown strength value. It is generally measured in units of potential difference over units of length, such as kilovolts per millimeter (kV/mm). As used herein, the term "high temperatures" refers to temperatures above about 100 degrees Celsius (° C.), unless otherwise indicated.

As noted, in one embodiment, the present invention provides a film that includes multiple layers. The first layer of the film is of a polymer dielectric material. In one embodiment, the polymer dielectric material has a glass transition temperature of at least about 150° C., and in some specific embodiments, at least about 220° C. Varieties of polymers exhibit this property, and are often referred to as "high temperature polymers". Non-limiting examples include polyethelenes, polyesters, polypropelenes, polycarbonates, polyetherimides, cyano modified polyetherimides, polyimides, polyphenol sulfides, polyphenelene oxides, styrene alloy, polysulfones, polyvinyledinedifluorides, polyvinylidenehexafluorides, polyarylethers, polyethersulfones, cyanoethyl cellulose, siloxane imide polymers, and various copolymers, which contain any of the foregoing. (Those skilled in the art understand that some of the listed polymers may be available in grades which don't meet the temperature criteria for this embodiment). In a particular embodiment, the polymer dielectric material of the first layer is a cyano-modified polyetherimide. Cyano modified polyetherimides and synthesis thereof is described in U.S. application Ser. Nos. 12/895,416 and 12/924,666, filed on 30 Sep. 2010, the entire contents of which are incorporated herein by reference. In a further embodiment, the cyano-modified polyetherimide includes structural units derived from a cyanobisphenol monomer. Moreover, many physical blends of the various polymers may also be used. In those instances, in one embodiment, each of the individual polymers would have a glass transition temperature of at least about 150° C.

In one embodiment, the polymer is a polymer composite. As used herein, the term "composite" is meant to refer to a material made of more than one component. Thus, in this embodiment, the polymer or copolymer contains at least one inorganic constituent e.g., a filler material. The polymer can be selected from the higher-temperature polymers set forth above, or can be a lower-temperature polymer (or copolymer or blend), i.e., one having a glass transition temperature of less than about 150° C. Examples of such polymers include polypropylene, polyesters, polycarbonates, polyethylene, polyphenylene sulfide, polyether, polyvinylidene difluoride, polyvinylchloride, or copolymers therefrom. Non-limiting examples of the inorganic constituents include siliceous materials, carbonaceous materials, metal hydrates, metal oxides, metal borides, and metal nitrides. In one embodiment, the inorganic constituent is at least one selected from powdered ferroelectric materials, barium titanate, boron nitride, aluminum oxide, strontium titanate, barium strontium titanate, alumina, titania, zirconia, magnesia, zinc oxide, cesium oxide, yttria, silica, lead zirconate, and lead zirconate titanate. The inorganic constituent can be in a variety of shapes or forms, e.g., particulates, fibers, platelets, whiskers, rods, or a combination of two or more of the foregoing. In one embodiment, the inorganic constituent (e.g., a particle) may be used in a form with a specified particle size, particle size distribution, average particle surface area, particle shape, and particle cross-sectional geometry. (Other specifications may also be adhered to, depending on the type of constituent, e.g., an aspect ratio in the case of whiskers or rods).

In one embodiment, the inorganic constituent may be present in the polymer composite in an amount from about 1 weight percent to about 80 weight percent based on the total weight of the polymer composite. In another embodiment, the inorganic constituent may be present in an amount from about 5 weight percent to about 60 weight percent based on the total weight of the polymer composite. In yet another embodiment, the inorganic constituent may be present in an amount from about 10 weight percent to about 50 weight percent based on the total weight of the polymer composite. In one embodiment, the first layer has a thickness in a range from about 0.05 micrometer to about 20 micrometers. In another embodiment, the first layer has a thickness in a range from about 20 micrometer to about 500 micrometers.

In the prior art, surface defects have caused a scattering of breakdown voltages in a dielectric, resulting in varying breakdown voltages at various locations in an article comprising a conventional polymer dielectric film. As one example, a capacitor comprising the polymer film as a dielectric layer could exhibit various surface defects, leading to a lowering of the overall breakdown voltage of the capacitor. Coating of the polymer dielectric surfaces may provide greater uniformity in a surface structure, thus reducing surface defects.

Accordingly, in one embodiment, a second layer of the film is disposed on the first layer. Depending on the application, the second layer may be deposited on one surface of the first layer or on opposing surfaces of the first layer. For example, if the surface defects on one (first) surface of the first layer are expected to be lesser than another (second) surface, then the second layer coating may be sufficient to be applied only to the second surface of the first layer. In another example, if the first layer was already formed over a substrate, then the second layer may be applied only to the surface that is exposed to the environment. Alternately, one surface of the first layer may receive some other coating than that of second layer material, depending on the requirement of the application in which the film is used, cost of the film, or ease of manufacturing. In one specific embodiment, the second layer is disposed on the opposing surfaces of the first layer.

The second layer may be of any material that decreases the surface defects and increases breakdown strength of the first layer. In one embodiment, the second layer material is able to adhere well with the first layer and has the similar or higher temperature withstanding capacity compared to the first layer. In one embodiment, the material of the second layer has similar or higher dielectric constant in comparison with the material of the first layer. In one embodiment, the second layer includes an inorganic oxide dielectric material. In one embodiment, the inorganic oxide dielectric material includes silicon dioxide, aluminum oxide, tantalum oxide, zirconium oxide, or mixtures thereof. In one particular embodiment, the inorganic oxide dielectric material used on the second layer is silicon dioxide.

Deposition of an inorganic material as the second layer on the first layer leads to a narrower breakdown voltage range for the combination of first and second layer and consequently, to enhancement and extension of the lifetime of an article in which the combination is used. Further, corona resistance, i.e., a measure of the time that a dielectric in an article would withstand a specified level of ionization without resulting in complete breakdown of the dielectric, can be increased by such surface treatment.

FIG. 1 provides a weibull probability chart of breakdown strengths of a cyano modified PEI (polyetherimide) film in comparison with the $SiO_2$ coated PEI film.

A Weibull distribution is a general distribution that can be used to model many specific distributions, such as the normal or exponential. The Weibull distribution used herein is obtained through an exponential distribution.

Figure 2:
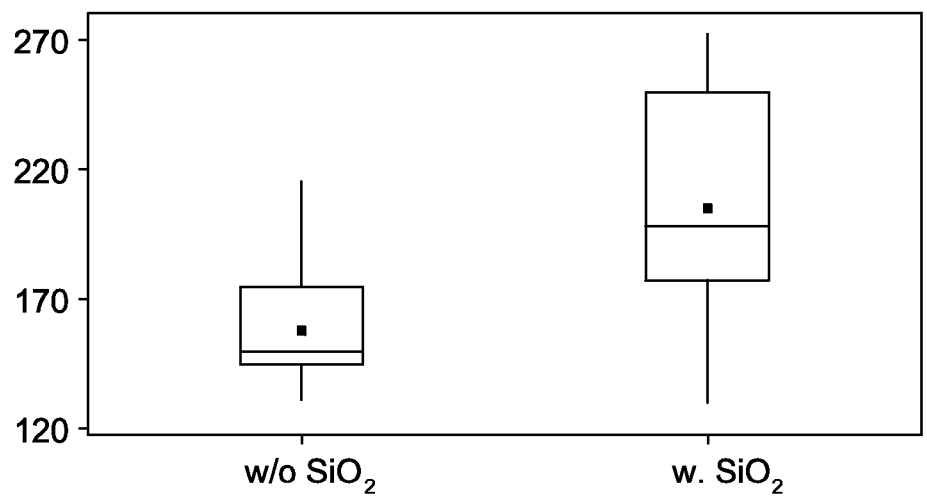
FIG. 2 is a comparative box chart, in accordance with one aspect of the invention.

The Weibull analyses was performed here is by collecting multiple breakdown strength data points and plotting them according to probability density function of a Weibull random values that happened versus their breakdown strengths. FIG. 1 shows the dotted straight line 10 and dashed straight line 18 corresponding to breakdown strengths of uncoated cyano-modified PEI (indicated by circular dots) and $SiO_2$ coated cyano-modified PEI (indicated by square dots), respectively. The thickness of PEI used was about 13 micrometer and the $SiO_2$ coating thickness was about 100 nanometer. The straight line 10 of uncoated PEI has two limit lines 12 and 14, within which the 90% of the breakdown entirety may be found. The straight line 18 has limit lines 20 and 22. It can be seen that $SiO_2$ coating results in higher probable breakdown strength of the PEI film. FIG. 2 provides a box plot comparison of breakdown strengths of a polymer composite PVDF-HFP (poly vinylidenedifluoride-hexafluoropropylene) with and without $SiO_2$ coating. An increase in breakdown strength with the $SiO_2$ coating is clearly seen from the graph.

The thickness of the second layer may be varied in a wide range and can be optimized to mask surface defects of the first layer and to decrease an added material cost and weight addition of the film. Experimentally a higher thickness of the second layer deposition found to be resulting in less variation of the breakdown strengths measured for the film. However, the addition of cost of second layer material and the weight increment due to second layer deposition may determine maximum thickness of the second layer coating of the film in particular applications. In one embodiment, the second layer has a thickness in a range from about 1 nanometer to about 500 nanometers. In a particular embodiment, the second layer has a thickness in a range from about 20 nanometers to about 100 nanometers. Examples of suitable coating processes include, but are not limited to, sputtering, electrochemical deposition, spin coating, dip coating, brush painting, solvent casting, and evaporation deposition.

At times first layer or the inorganic oxide second layer may be susceptible to the environmental conditions such as, for example, moisture. Therefore a coating of a moisture barrier material as a third layer is helpful in extending the life time of the film. Accordingly, in one embodiment, a third layer of the film is disposed on the first or second layer. The third layer may be selected from a material different from the second layer material. The third layer, along with functioning as a moisture barrier, may provide the functional enhancement similar or different to that of second layer material. In one embodiment, the third layer material is able to adhere well with the first and second layer and has the similar or higher temperature withstanding capacity compared to the first layer. In one embodiment, the material of the third layer has similar or higher dielectric constant in comparison with the material of the first layer. In one embodiment, the third layer includes a nitride or oxynitride material. In a further embodiment, the third layer includes silicon nitride, silicon oxynitride, aluminum nitride, or combinations of any of the foregoing. In a particular embodiment, the third layer includes silicon nitride.

Figure 3:
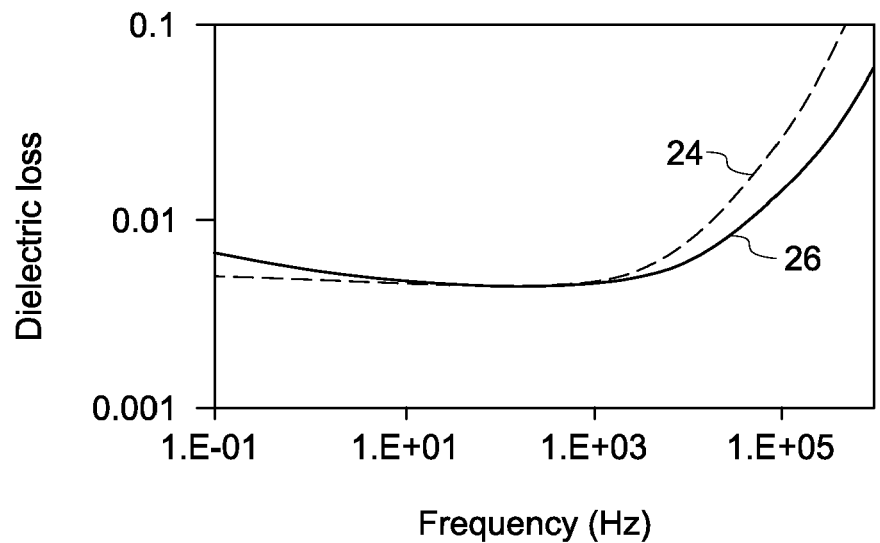
FIG. 3 is a comparative graph, in accordance with one aspect of the invention.

FIG. 3 provides a comparative graph of dielectric loss of a PEI film coated with 250 nm thick $SiN_x$ in an as received 24 state and after exposure to about 80% humidity 26. It is clearly observable from the graph that the exposure to moisture does not increase the dielectric loss of $SiN_x$ coated PEI film.

Figure 4:
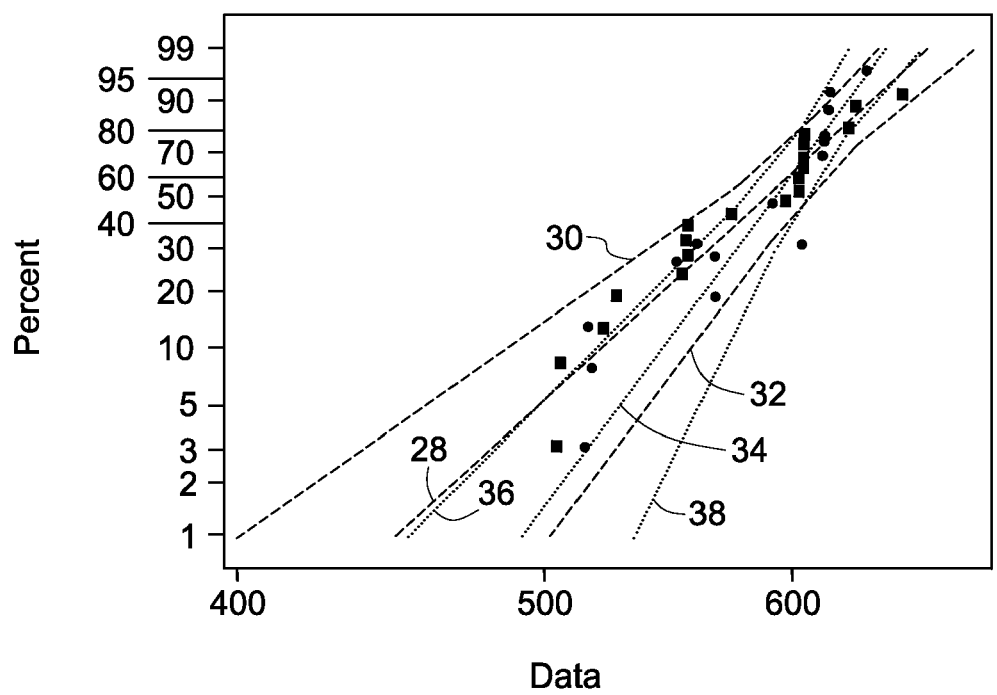
FIG. 4 is a comparative weibull probability plot, in accordance with one aspect of the invention.

FIG. 4 provides a Weibull probability chart of breakdown strengths of a PEI film 28 (corresponding to square dots) with limit lines 30 and 32 in comparison with the $SiN_x$ coated PEI film 34 (corresponding to circle dots) with limit lines 36 and 38. Similar to the result obtained with $SiO_2$ coating, it is observed that SiNx coating results in higher probable breakdown strength of the PEI film. However, thicker inorganic layers were found to be favorable for higher thermal conductivity. Therefore, for getting compounding effects of increased breakdown strength, increased thermal conductivity and increased moisture barrier properties, an inorganic oxide second layer deposition and an oxide or oxynitride material third layer deposition is preferred for a film comprising polymer dielectric.

Figure 5:
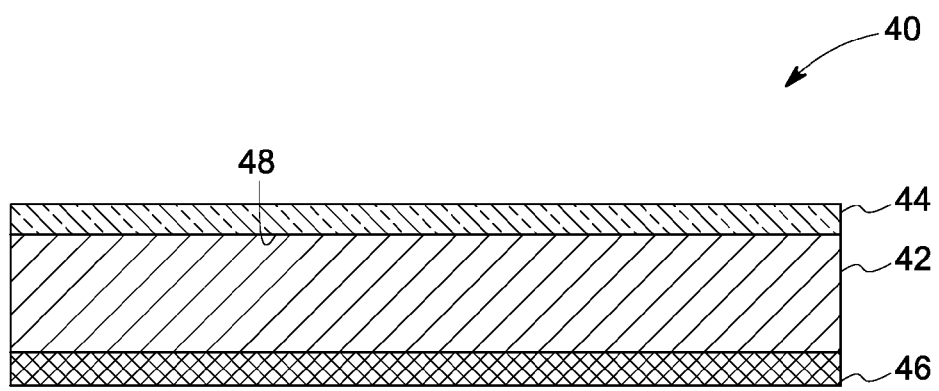
FIGS. 5-9 are cross-sectional views of films, in accordance with different aspects of the invention.

The deposition of second layer and third layers may be in certain combination depending on the required functional properties and end applications. In one embodiment, the second layer is disposed on the first surface of the first layer and the third layer is disposed on the second surface of the first layer as depicted in FIG. 5. FIG. 5 represents a cross-sectional view of a film 40 in accordance with an embodiment of the invention. The film 40 includes the first layer 42, second layer 44 and third layer 46. In one example, the first layer 42 is a polyetherimide layer, including a first surface 48 coated with the second layer 44.

Figure 6:
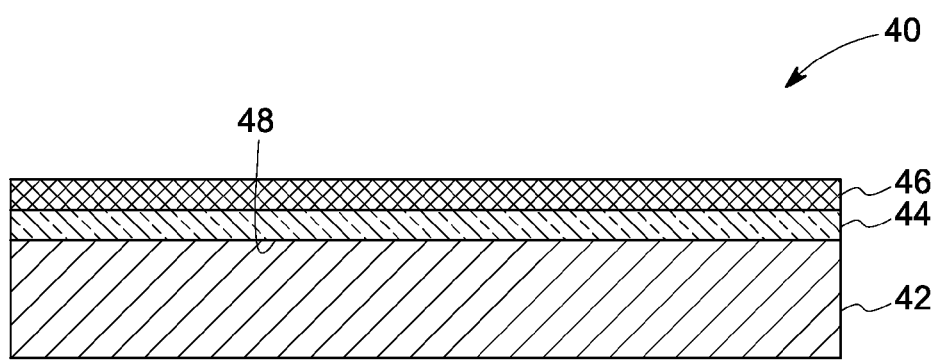
Figure 7:
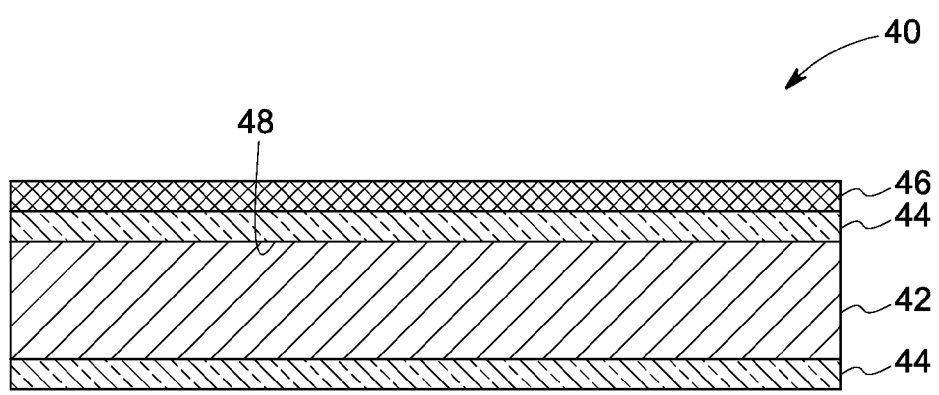
Figure 8:
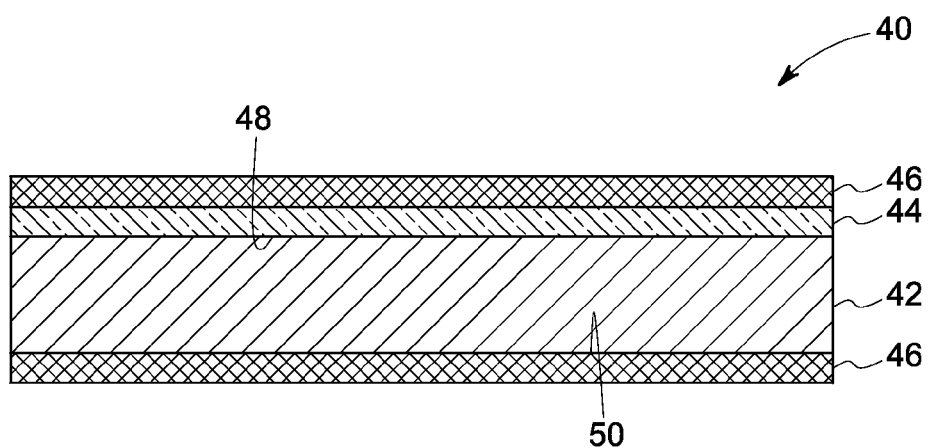
Figure 9:
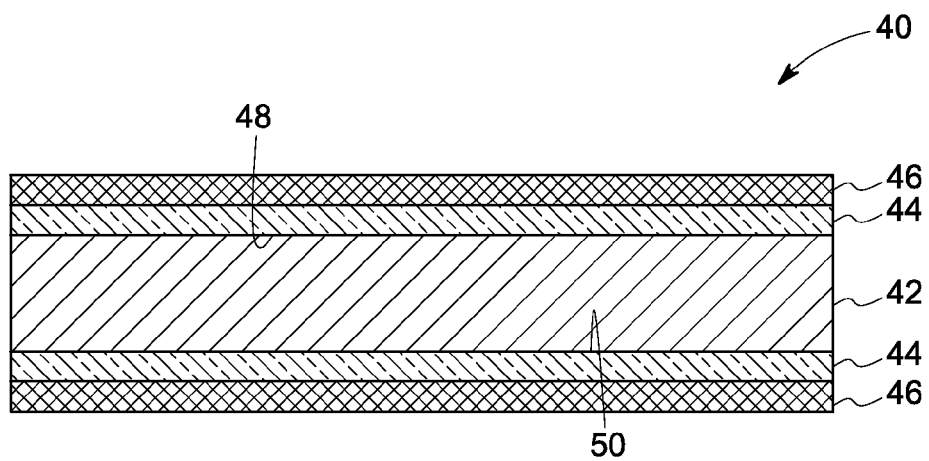

In another embodiment, the second layer 44 is disposed on the first surface 48 of the first layer 42 and the third layer 46 is disposed on the second layer 44 as depicted in FIG. 6. In yet another embodiment, as depicted in FIG. 7, the second layer 44 is disposed on the opposing surfaces of the first layer 42 and the third layer 46 is disposed on one of the second layer 44 deposition. In one more embodiment, the second layer 44 is disposed on the first surface 48 of the first layer 42 and the third layer 46 is disposed on the second surface 50 of the first layer 42 and over the second layer 44 as depicted in FIG. 8. In a particular embodiment, the second layer 44 is disposed on the opposing surfaces of the first layer 42 and the third layer 46 is disposed on both the second layers 44 as depicted in FIG. 9.

In one embodiment, the third layer has a thickness in a range from about 1 nanometer to about 500 nanometers. In a particular embodiment, the third layer has a thickness in a range from about 20 nanometers to about 100 nanometers.

In one embodiment, the film has a length in the range from about 10 centimeters to about 10,000 centimeters, and a width in a range from about 10 centimeters to about 200 centimeters. In one embodiment, the film has a thickness in a range from about 1 micrometer to about 20 micrometers. In another embodiment, the film has a thickness in a range from about 20 micrometer to about 500 micrometers.

In one embodiment, the film can operate at a temperature in a range from about −50° C. to about 220° C. In another embodiment, the film has a breakdown voltage up to about 800 kilovolts per millimeter. In a particular embodiment, the film has a breakdown voltage in a range from about 300 kilovolts per millimeter to about 800 kilovolts per millimeter. In one embodiment, the film has a thermal conductivity greater than about 0.3 W/mK.

Figure 10:
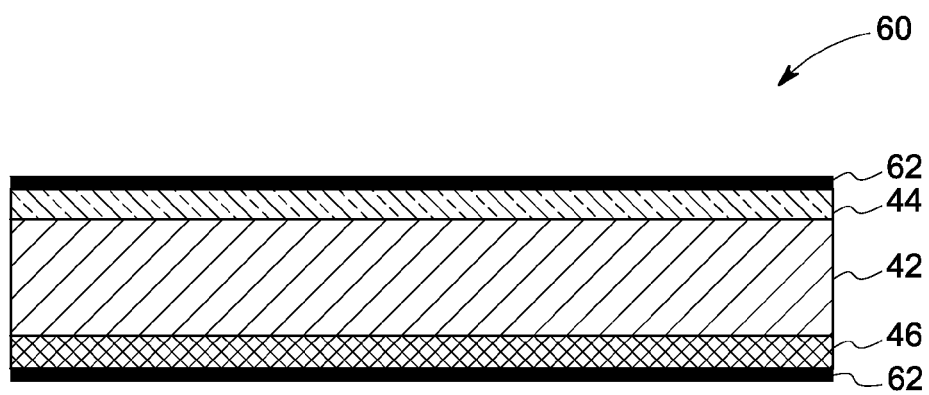
FIG. 10 is a cross-sectional view of an article, in accordance with one aspect of the invention.

In one embodiment, an article including the film is provided. The article may include one or more layers of polymer materials coated with an inorganic material and a moisture barrier material as described above. Non-limiting examples of the article include a capacitor, an insulation film/layer, or insulating tapes. As an example, the tapes can be used as part of the insulation system for devices such as rotating machinery, transformers, cables, and other electrical devices. In one embodiment, the article is a capacitor. In one embodiment, the film works as a dielectric layer within a capacitor. FIG. 10 represents a cross-sectional view of an example article 60. The article in this example is a capacitor with the first layer 42, second layers 44, third layers 46 and the electrodes 62.

In one embodiment, the film may exhibit a variety of enhanced properties, as compared to the dielectric polymer of the first layer. Examples of such properties include: higher dielectric constants; increased dielectric breakdown voltage, reduced surface defects, and increased corona breakdown resistance.

The aforementioned embodiments present clear advantages over existing capacitors and methods for making such capacitors. For example, it has been found the capacitors made by the foregoing layered structure films offer increased dielectric breakdown voltage, increased energy storage, and extended life, while maintaining all other high performance parameters; resistivity, loss factor, and discharge efficiency compared to the conventionally known capacitors based on polymers.

EXAMPLES

The following examples illustrate methods and embodiments in accordance with the invention, and as such, should not be construed as imposing limitations upon the claims.

Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

The polyetherimide polymer films are commercially available from Mitsubish Plastics, Inc. The films are used as substrate for the coating materials such as SiO2 and SiNx. The film thicknesses used in the following examples are 13 um and 25 um.

Sputter Deposition of $SiO_2$ Layer

A Perkin Elmer Model 4450 sputtering machine was used to deposit $SiO_2$ coating on the first polymer layer. The sputtering targets of SiO2 were fixed inside the sputtering system and cleaned thoroughly. The polymer first layer was hooped on a metal ring to keep the film from winkling and then placed on the substrate in the sputtering system. The system was then pumped down to a base vacuum of 2.5e-7 Torr. The substrate was water cooled to maintain the substrate temperature below 100° C. to ensure a low temperature $SiO_2$ deposition. A 3 kW RF power supply was used to run $SiO_2$ sputtering in RF mode. The sputter pressure was controlled at 5.0 mT using an Argon gas flow (40 sccm) and an oxygen flow (2.5 sccm). $SiO_2$ film was deposited on the polymer first layer under a RF power density of ~2.3 $W/cm^2$, and an induced substrate bias of −40 V, at a deposition rate of ~29 A/min at 10 RPM table rotation. Deposition time is dependent on desired thickness. Each run was carried out using 15-minute deposition cycles with 15 minute pump/pause between cycles. The process of deposition was repeated for the opposite surface of the polymer first layer. The $SiO_2$ coated polymer first layers were then stored in a portable Desi-Vac Container to avoid moisture absorption.

PECVD of $SiN_x$ Coating $SiN_x$ coating was carried out on PEI films and $SiO_2$ coated PEI films. Thin $SiN_x$ films were deposited on a PEI first layer sample (25 micron in thickness) in a conventional Plasma Therm 790 SLR capacitively coupled reactive ion etching (RIE) system. The vacuum system comprises of two horizontal-oriented, circular 11" diameter, aluminum electrodes separated by an approximate 1-2" gap. The samples to be coated were typically placed on the bottom electrode. The reactor was then pumped down to the base pressure (ca. 1 mTorr) for 5 min to evacuate all air from the system. Process gases were introduced inside the reaction zone. An operating reactor pressure of 0.05-2 Torr was set through an automated throttle valve. Once pressure was set the RF power was applied to (typically) the top electrode and runs until the desired process time is reached. The RF power was then terminated and the throttle valve opened up. The reactor was then vented and the samples are removed. Similar process was used to coat $SiN_x$ over $SiO_2$ coated polymer films.

Testing and Measurements:

Characterization of Films

SEM technique was used to reveal coating layer on the PEI first layers. Thickness and coating morphology were obtained from the imaging. Profilometer was used to show the film surface roughness. For the uncoated PEI films, the roughness is on the order of 100-200 nm. Similar roughness was observed after applying inorganic coating. In order to ascertain the second layer as $SiO_2$ coating and third layer as SiNx coating, refractive index and XPS analyses were performed on the second and third layers. In some of the experiments conducted, the composition of SiNx layer is found to be close to the formula $Si_3N_4$.

Dielectric Response

Dielectric loss is a parameter of a dielectric material that quantifies its inherent dissipation of electromagnetic energy in an alternating electrical field. The high dielectric loss eventually caused temperature rise of the dielectric materials. The polymer layers, $SiO_2$ second layer coated polymer layer, $SiN_x$ third layer coated polymer layers, and $SiN_x$ third layer coated on $SiO_2$ second layer coated polymer layers were characterized for their dielectric losses. The films studied for the dielectric loss were about 13-50 micron thick and were sputter coated with platinum electrodes before the dielectric measurements. The dielectric response tests were carried out at room temperature at a frequency of 10-2-106 Hz using HP4285A impedance analyzer per ASTM D 150 standard.

Protection Against Moisture Absorption $SiO_2$ coated PEI film had exhibited a higher dielectric loss after the film exposed to a humidity of above 30%. A $SiN_x$ third layer coating on the $SiO_2$ coated polymer layer has significantly decreased the dielectric loss and increased breakdown strength of the film that was subjected to the humidity exposure.

Breakdown Strength

Figure 11:
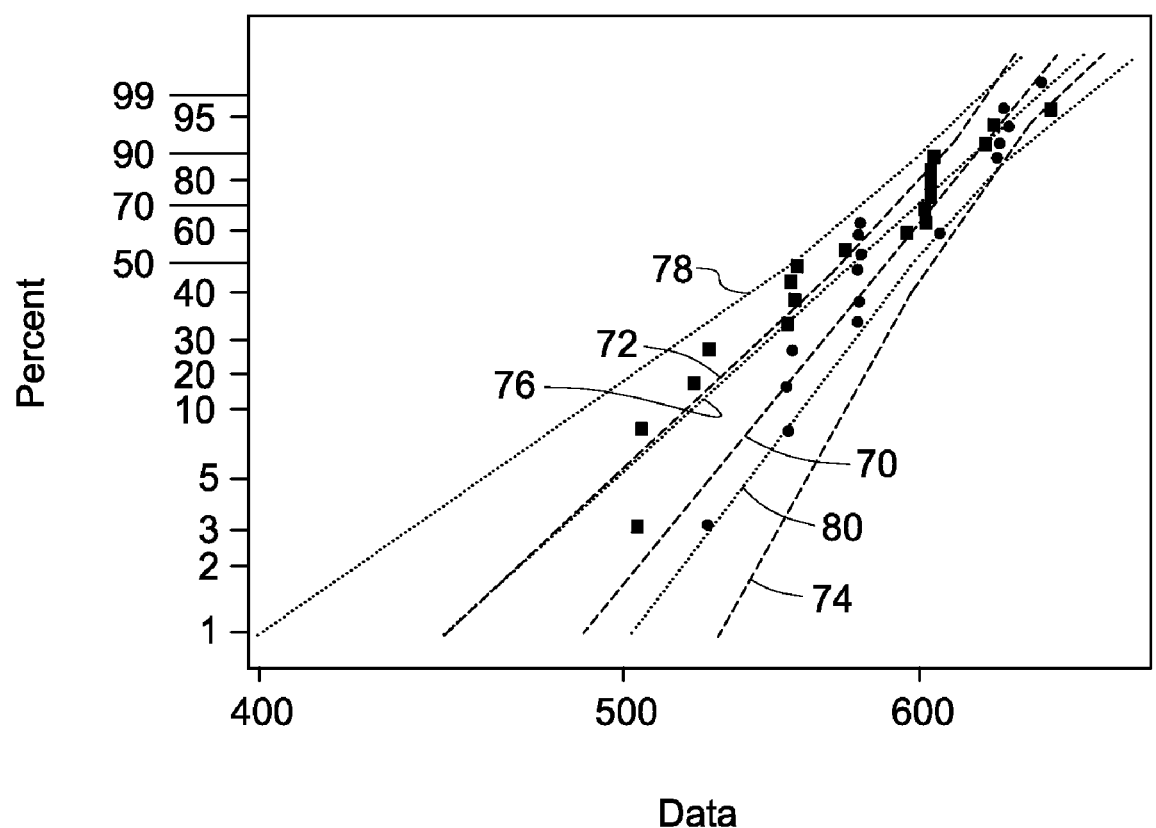
FIG. 11 is a comparative weibull probability plot, in accordance with one aspect of the invention.

The polymer layers, $SiO_2$ second layer coated polymer layer, $SiN_x$ third layer coated polymer layers, and $SiN_x$ third layer coated on $SiO_2$ second layer coated polymer layers were subjected to breakdown strength tests by applying a DC electric field at an increasing rate of 500 volts per second. The measurements utilized a metal ball-plane testing configuration per ASTM D 3755 standard. The breakdown voltage on the Hipotronics power generator was recorded when the film breaks into holes and a high leakage current is reached. FIG. 11 provides a weibull probability chart of breakdown strengths of a PEI film 76 (corresponding to square dots) with limit lines 78 and 80 in comparison with the SiNx/SiO2 coated PEI film 70 (corresponding to circle dots) with limit lines 72 and 74. The figure shows that additional SiNx capping layer does not decrease the effect of $SiO_2$ coating on breakdown strength of the PEI. Optimization of thicknesses of $SiO_2$ second layer and $SiN_x$ third layer is expected to increase the breakdown strength of PEI film with further decreased breakdown strength variations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A film comprising:
   a first layer comprising a cyano-modified polyetherimide as a polymer dielectric material;
   a second layer comprising an inorganic oxide dielectric material disposed on at least one surface of the first layer; and
   a third layer comprising silicon nitride, silicon oxynitride, aluminum nitride, or a combination thereof, disposed on the first or second layer.

2. The film of claim 1, wherein the cyano-modified polyetherimide comprises structural units derived from a cyanobisphenol monomer.

3. The film of claim 1, wherein the thickness of the first layer is in the range from about 0.05 micron to about 20 microns.

4. The film of claim 1, wherein the thickness of the first layer is in the range from about 20 microns to about 500 microns.

5. The film of claim 1, wherein the inorganic oxide dielectric material of the second layer comprises silicon dioxide, aluminum oxide, tantalum oxide, zirconium oxide, or mixtures thereof.

6. The film of claim 5, wherein the inorganic oxide dielectric material is silicon dioxide.

7. The film of claim 5, wherein the thickness of the second layer is in the range from about 1 nm to about 500 nm.

8. The film of claim 1, wherein the third layer comprises silicon nitride.

9. The film of claim 1, wherein the thermal conductivity of the film is greater than 0.3 W/mK.

10. The film of claim 1, wherein the film is operational at a temperature range from about −50 degree Celcius to about 220 degree Celcius.

11. The film of claim 1, wherein the film has a breakdown strength of up to about 800 kV/mm.

12. The film of claim 1, wherein the second layer is disposed on the opposing surfaces of the first layer.

13. A film comprising:
    a first layer having first and second surface and comprising a polyetherimide composition;
    a second layer comprising silicon dioxide, disposed on the first surface of the first layer; and
    a third layer comprising silicon nitride disposed on the second surface of the first layer,
    wherein the polyetherimide comprises structural units derived from a cyanobisphenol monomer.

14. The film of claim 13, wherein the film further comprises silicon nitride disposed on the silicon dioxide layer.

15. An electronic article comprising:
    a film comprising:
       a first layer comprising a polyetherimide composition;
       a second layer comprising silicon dioxide disposed on at least one surface of the first layer; and
       a third layer comprising silicon nitride and disposed on the first or second layer,
    wherein the polyetherimide comprises structural units derived from a cyanobisphenol monomer.

* * * * *